(12) United States Patent
Eom et al.

(10) Patent No.: US 8,816,592 B2
(45) Date of Patent: Aug. 26, 2014

(54) ACTIVE DAMPER AND DRIVING METHOD THEREOF

(75) Inventors: Hyun-Chul Eom, Seoul (KR); Seunguk Yang, Anyang (KR); Gye-Hyun Cho, Incheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 184 days.

(21) Appl. No.: 13/473,908

(22) Filed: May 17, 2012

(65) Prior Publication Data

US 2012/0293085 A1    Nov. 22, 2012

Related U.S. Application Data

(60) Provisional application No. 61/488,058, filed on May 19, 2011.

(30) Foreign Application Priority Data

Apr. 17, 2012    (KR) .......................... 10-2012-0039958

(51) Int. Cl.
*H05B 37/02*    (2006.01)

(52) U.S. Cl.
USPC ....... 315/200 R; 315/158; 315/194; 327/544; 327/310

(58) Field of Classification Search
CPC ...................... H05B 41/2851–41/2858; H05B 41/2921–41/2958
USPC ........ 323/241, 285; 363/21.12; 327/544, 310; 315/158, 194, 200 R, 209 R, 226, 250, 315/291

See application file for complete search history.

(56) References Cited

U.S. PATENT DOCUMENTS

| | | | | |
|---|---|---|---|---|
| 6,088,247 | A  * | 7/2000 | Cheng | 363/56.11 |
| 6,963,240 | B2 * | 11/2005 | Bonaccio et al. | 327/544 |
| 7,203,838 | B1 * | 4/2007 | Glazer et al. | 713/176 |
| 8,610,363 | B2 * | 12/2013 | Otake et al. | 315/194 |
| 2012/0268031 | A1 * | 10/2012 | Zhou et al. | 315/291 |

* cited by examiner

*Primary Examiner* — Vibol Tan
(74) *Attorney, Agent, or Firm* — Okamoto & Benedicto LLP

(57) ABSTRACT

An exemplary embodiment of the present invention relates to an active damper and a driving method thereof. An AC input passed through a dimmer is transmitted to an active damper through a rectification circuit. The active damper includes a damper resistor connected to the rectification circuit, a damper switch connected to the damper resistor in parallel, and a delay circuit delaying a turn-on time of the damper switch by a predetermined initial period from a turn-on time of the dimmer.

11 Claims, 4 Drawing Sheets

US 8,816,592 B2

ACTIVE DAMPER AND DRIVING METHOD THEREOF

CROSS-REFERENCE TO RELATED APPLICATION

This application claims priority to and the benefit of U.S. Patent Application No. 61/488,058 filed in the USPTO on May 19, 2011, and Korean Patent Application No. 10-2012-0039958 filed in the Korean Intellectual Property Office on Apr. 17, 2012, the entire contents of which are incorporated herein by reference.

BACKGROUND OF THE INVENTION (a) Field of the Invention

An exemplary embodiment of the present invention relates to an active damper and a driving method thereof.

(b) Description of the Related Art

An AC input passed through a dimmer is rectified through a rectification circuit and then supplied to a power supply. The AC input rectified through the rectification circuit becomes an input voltage and an input current of the power supply.

The AC input passed through the dimmer is cut according to a dimming angle. That is, a portion corresponding to the dimming angle is passed through the dimmer during one cycle of a sinewave AC input.

When the AC input passed through the dimmer is rectified, a portion where the input voltage and the input current are rapidly increased is generated and spike of the input voltage or ringing of the input current occurs in the portion. A negative current due to the ringing of the input current may cause a problem of turning off the dimmer.

A damper is an element provided between the rectification circuit and the power supply to prevent the spike of the input voltage and the ringing of the input current. In general, the damper is realized as a resistor.

In this case, the spike and the ringing cannot be effectively prevented with the damper uses low resistance. Accordingly, power consumption and temperature problems occur due to the damper resistance.

FIG. 1 shows an input voltage and an input current when resistance of the damper of 25Ω.

FIG. 2 shows an input voltage and an input current when resistance of the damper is 200Ω.

As shown in FIG. 1, when the resistance is 25Ω, spike and ringing are generated in the input voltage and the input current, respectively.

However, as shown in FIG. 2, when the resistance is 200Ω, spike and ringing are not generated in the input voltage and the input current in a circle area marked by the dotted line.

However, the power consumption and temperature increase still remain as problems.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an active damper that can prevent power consumption and temperature increase, and a driving method thereof.

An active damper according to an exemplary embodiment of the present invention receives an AC input passed through a dimmer. Here, the AC input is transmitted through a rectification circuit. The active damper includes a damper resistor connected to the rectification circuit, a damper switch connected to the damper resistor in parallel, and a delay circuit delaying a turn-on time of the damper switch by a predetermined initial period from a turn-on time of the dimmer.

The delay circuit includes a resistor including a first end connected to a first end of the damper resistor and a capacitor connected between a second end of the resistor and a second end of the damper resistor.

The damper switch includes a gate electrode connected to a node of the resistor and the capacitor.

The active damper further includes a reset circuit that resets the delay circuit. The delay circuit includes a diode having a cathode connected to a first end of the damper resistor and an anode connected to a gate electrode of the damper switch.

The input current passed through the rectification circuit flows to a power supply through the active damper. The input current flows through the damper resistor during the initial period, and then the input current flows through the damper switch after the initial period elapses.

A driving method according to another exemplary embodiment of the present invention is provided to an active damper to which an AC input passed through a dimmer is transmitted through a rectification circuit, and the active dimmer including a damper resistor and a damper switch connected to the damper resistor in parallel. The driving method includes: charging a capacitor connected between a gate electrode and a source electrode of the damper switch during a in initial period from a turn-on time of the dimmer; and turning on the damper switch when a gate-source voltage of the damper switch reaches a threshold voltage by a voltage charged in the capacitor during the initial period.

The driving method of the active damper further include, during a normal period during which the damper switch is turned on, constantly maintaining a both-end voltage of the damper resistor with the threshold voltage.

The driving method of the active damper further includes flowing an input current passed through the rectification circuit through the damper resistor during the initial period and flowing the input current through the damper switch during the normal period.

The driving method of the active damper further includes: connecting a diode when the both-end voltage of the damper resistor becomes lower than the threshold voltage of the damper switch by a decrease of the input current passed through the rectification circuit; and discharging the voltage charged in the capacitor through the connected diode.

According to the present invention, an active damper that can prevent power consumption and temperature increase, and a driving method thereof can be provided.

DETAILED DESCRIPTION OF THE EMBODIMENTS

Figure 1:
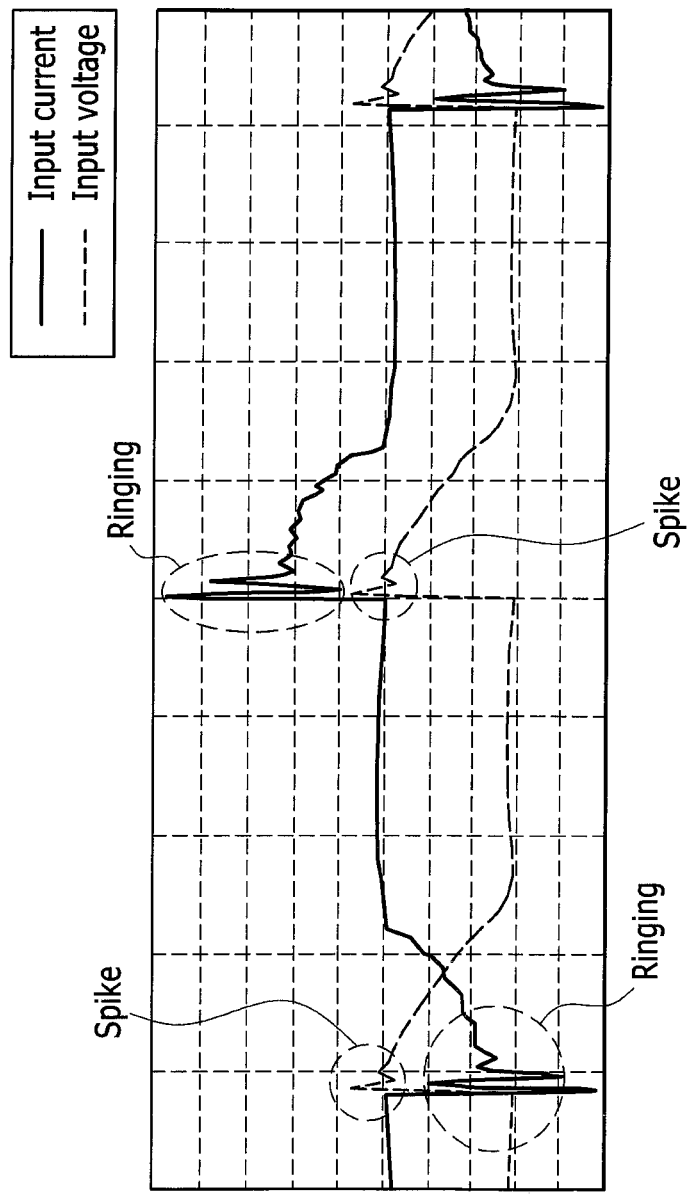
FIG. 1 shows an input voltage and an input voltage when resistance of a damper is 25Ω.
Figure 2:
FIG. 2 shows an input voltage and an input current when resistance of the damper is 200Ω.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Figure 3:
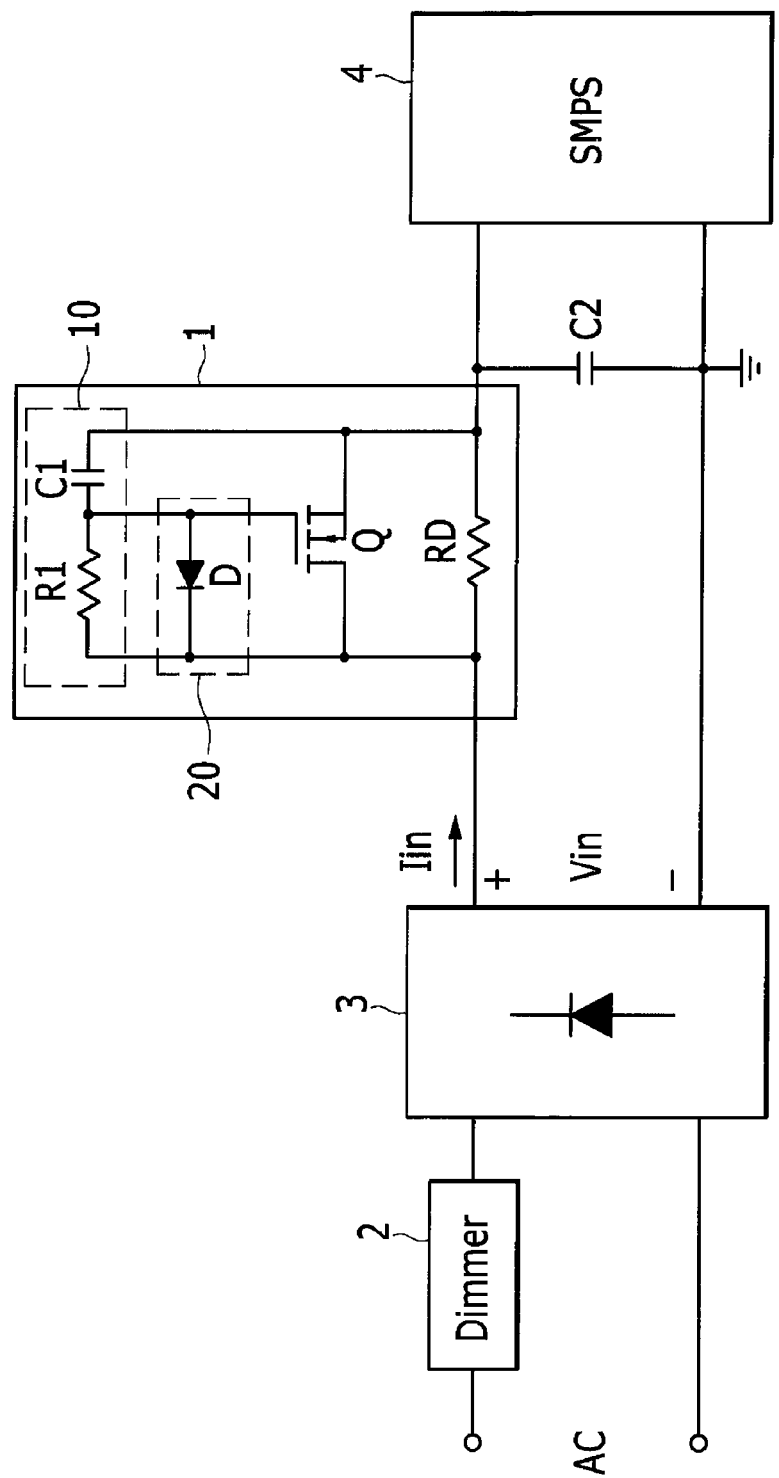
FIG. 3 shows an active damper according to an exemplary embodiment of the present invention.

FIG. 3 shows an active damper according to an exemplary embodiment of the present invention.

As shown in FIG. 3, an active damper 1 is connected between a bridge diode 3 and a switch mode power supply (SMPS). The bridge diode 3 is an example of a rectification circuit and the SMPS4 is an example of a power supply.

An AC input is input to the bridge diode 3 through a dimmer 2. Among the AC input passed through the dimmer 2, a portion corresponding to a dimming angle remains. The dimming angle determines a portion of the AC input, which can pass through the dimmer 2. As the dimming angle is increased, a portion that passes through the dimmer 2 during one cycle of the AC input is increased.

The bridge diode 3 rectifies the AC input passed through the dimmer 2 to generate an input voltage Vin and an input current Iin.

The active damper 1 operates with high resistance during an initial period of one cycle of the input voltage Vin and the input current Iin and then operates with low resistance during a normal period of the rest period of the cycle. The active damper 1 repeats such an operation for each cycle of the input voltage Vin and the input current Iin.

A period from a turn-on time of the dimmer 2 to the next turn-on time of the dimmer 2 is one cycle of the input voltage Vin and the input voltage Iin. The input voltage Vin and the input current Iin are generated at the turn-on time of the dimmer 2, and the input voltage Vin and the input current Iin are rapidly increased.

When the active damper 1 operates with high resistance during the initial period from the time that the input voltage Vin and the input current Iin are rapidly increased, spike of the input voltage Vin and ringing of the input current Iin can be prevented.

When the initial period is terminated, the spike and ringing due to the increase of the input voltage Vin and the input voltage Iin are not generated, and therefore the active damper 1 operates with low resistance during the normal period so as to prevent high power consumption and temperature increase.

Hereinafter, a cycle implies a cycle of an input voltage Vin and a cycle of an input current Iin.

As shown in FIG. 3, the active damper 1 includes a delay circuit 10, a reset circuit 20, a damper switch Q, and a damper resistor RD. The reset circuit 20 according to the exemplary embodiment of the present invention is realized as a diode D. However, the present invention is not limited thereto.

A first end of the damper resistor RD is connected to an output terminal of the bridge diode 3, and a second end of the damper resistor RD is connected to an input terminal of the SMPS 4. A smooth capacitor C2 that smoothes the input voltage Vin is connected between the input terminal of the SMPS 4 and a ground.

The damper switch Q is connected to the damper resistor RD in parallel. The damper switch Q according to the exemplary embodiment of the present invention is an N-channel type transistor, and therefore, a drain electrode of the damper switch Q is connected to the output terminal of the bridge diode 3 and a source electrode of the damper switch Q is connected to the input terminal of the SMPS 4. Therefore, the input voltage Vin and the input current Iin are transmitted to the SMPS 4 through the damper resistor RD or the damper switch Q.

The delay circuit 10 controls the active damper 1 to be operated with the damper resistor RD during the initial period from the turn-on time of the dimmer 2. That is, the delay circuit 10 delays turn-on of the damper transistor Q during an initial period of each cycle.

The delay circuit 10 includes a resistor R1 and a capacitor C1. A first end of the resistor R1 is connected to a first end of the damper resistor RD and the input voltage Vin, a second end of the resistor R1 is connected to a first end of the capacitor C1, and a second end of the capacitor C1 is connected to a second end of the damper resistor RD. A gate electrode of the damper switch Q is connected to the first end of the capacitor C1.

When the dimmer 2 is turned on and thus an input voltage Vin is generated, the capacitor C1 is charged during the initial period. When a voltage difference between the gate electrode and the source electrode of the damper switch Q reaches to a threshold voltage of the damper switch Q due to charging of the capacitor C1, the damper switch Q is turned on.

Since the damper switch Q is in the turn-off state during the initial period, the input voltage Vin and the input current Iin are transmitted to the SMPS 4 through the damper resistor RD. The initial period is terminated at the turn-on time of the damper switch Q.

Since the damper switch Q is turned on by a voltage charged by the capacitor C1 and the capacitor C1 is an open circuit from a viewpoint of a direction current (DC), no current transmitted to the capacitor C1 through the resistor R1 is generated. Accordingly, a gate-source voltage of the damper switch Q is constantly maintained with the threshold voltage of the damper switch Q, charged by the capacitor C1.

In this case, the drain electrode and the gate electrode of the damper switch Q is in a short-circuit state, and therefore a voltage between the drain electrode and the source electrode of the damper switch Q is equivalent to a voltage between the gate electrode and the source electrode. Therefore, a both-end voltage of the damper resistor RD is constantly regulated to the threshold voltage of the damper switch Q.

A period during which the damper switch Q maintains the turn-on state is the normal period, and during the normal period, the input voltage Vin and the input current Iin are transmitted to the SMPS 4 through the damper switch Q.

Thus, during the normal period, the resistance of the active damper 1 is on-resistance of the damper switch Q, and accordingly, the resistance of the active damper 1 maintains low resistance.

The diode D, which is the reset circuit 20, is connected when the both-end voltage of the damper resistor RD becomes lower than the threshold voltage of the damper switch Q due to a decrease of the input current Iin. That is, when the both-end voltage of the damper resistor RD becomes lower than the threshold voltage of the damper switch Q, the reset circuit 20 starts operation.

When the diode D is turned on, the voltage charged in the capacitor C1 is discharged through the diode D. In this case, the damper switch Q is turned off.

Hereinafter, operation of the active damper 1 will be described in further detail with reference to FIG. 4.

Figure 4:
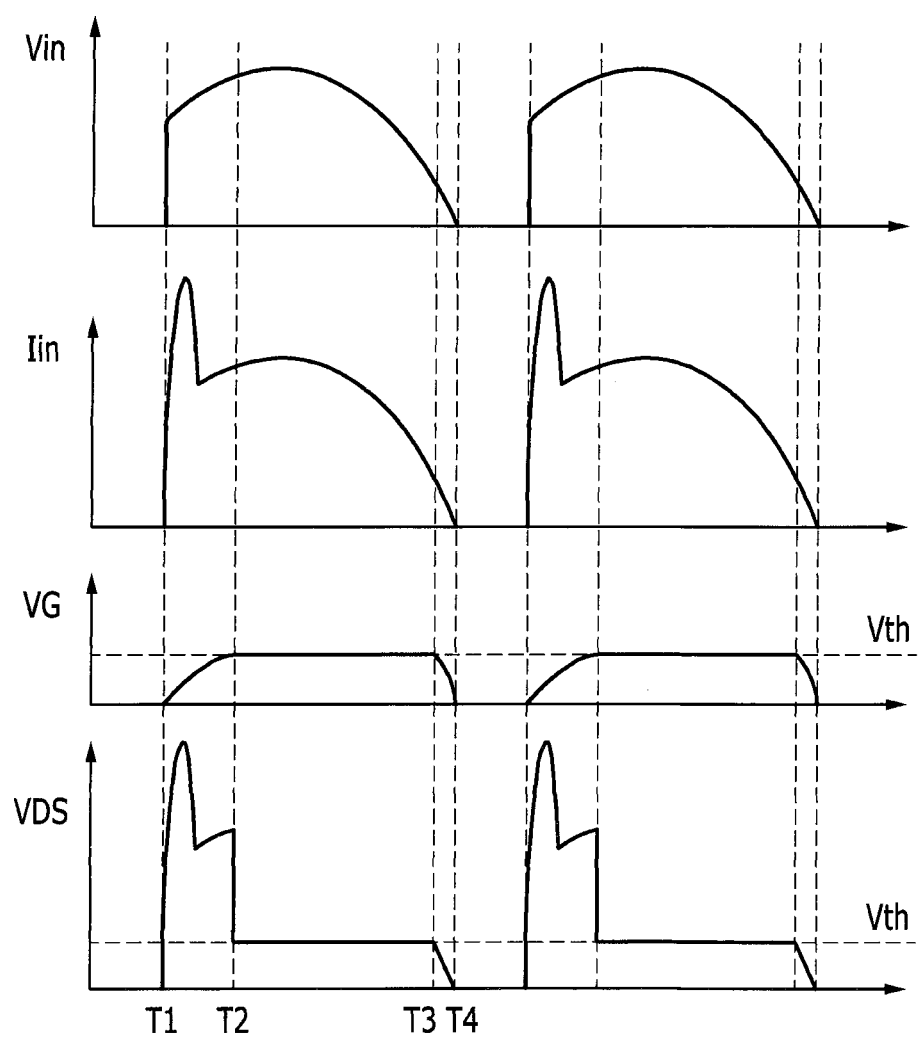
FIG. 4 is a waveform of an input voltage, an input current, a gate voltage, and a drain-source voltage generated in accordance with application of the active damper of the exemplary embodiment of the present invention.

FIG. 4 is a waveform diagram of an input voltage, an input current, a gate voltage, and a drain-source voltage generated in accordance of application of the active damper 1 according to the exemplary embodiment of the present invention. The drain-source voltage is equivalent to the both-end voltage of the damper resistor RD.

As shown in FIG. 4, the dimmer 2 is turned on at a time T1 and thus the input voltage Vin and the input current Iin are generated. The capacitor C1 starts charging by the input voltage Vin such that the gate voltage VG starts to increase from the time T1.

From the time T1, the drain-source voltage VDS has the same waveform of the input current Iin because the drain-source voltage VDS is generated when the input current Iin flows through the damper resistor RD.

When the gate voltage VG reaches the threshold voltage Vth of the damper switch Q at a time T2, the damper switch Q is turned on and the drain-source voltage is rapidly decreased to the threshold voltage Vth. From the time T2, the drain-source voltage VDS is constantly maintained with the threshold voltage Vth.

When the input current Iin decreases and thus the both-end voltage of the damper resistor RD is lower than the threshold voltage Vth at a time T3, the voltage of the capacitor C1 is discharged by the diode D. Then, the gate voltage VG becomes lower than the threshold voltage Vth, and thus the damper switch Q is turned off and the drain-source voltage VDS becomes a voltage generated from the input current Iin flowing to the damper resistor RD. That is, the drain-source voltage decrease according to the input current Iin.

In FIG. 4, a period T1 to T2 is the initial period, and a period T2 to T3 is the normal period.

As described, according to the exemplary embodiment of the present invention, the spike of the input voltage Vin and the ringing of the input current Iin can be prevented by the damper resistor RD during the initial period, and the both-end voltage of the damper resistor RD is regulated to the threshold voltage of the damper switch Q during the normal period such that an increase of power consumption and temperature increase can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS active damper 1, delay circuit 10, reset circuit 20
damper switch Q, damper resistor RD, bridge diode 3
Smooth capacitor C2, SMPS 4, resistor R1
capacitor C1, diode (D), dimmer 2

What is claimed is:

1. An active damper that receives an input current that is generated from an AC input that is passed through a dimmer and rectified by a rectification circuit, the active damper comprising:
   a damper resistor connected to the rectification circuit;
   a damper switch connected to the damper resistor in parallel; and
   a delay circuit delaying a turn-on time of the damper switch by a predetermined initial period from a turn-on time of the dimmer,
   wherein after the damper switch is turned-on, the damper switch is turned-off based on a voltage that is developed and sensed across the damper resistor.

2. The active damper of claim 1, wherein the delay circuit comprises:
   a resistor including a first end connected to a first end of the damper resistor, and
   a capacitor connected between a second end of the resistor and a second end of the damper resistor.

3. The active damper of claim 2, wherein the damper switch comprises a gate electrode connected to a node of the resistor and the capacitor.

4. The active damper of claim 1, further comprising a reset circuit that resets the delay circuit based on the voltage that is developed and sensed across the damper resistor.

5. The active damper of claim 4, wherein the reset circuit comprises a diode having a cathode connected to a first end of the damper resistor and an anode connected to a gate electrode of the damper switch.

6. The active damper of claim 1, wherein the input current flows to a power supply through the active damper.

7. The active damper of claim 6, wherein the input current flows through the damper resistor during an initial period, and then the input current flows through the damper switch after the initial period elapses.

8. A driving method of an active damper that receives an input current that is generated from an AC input that is passed through a dimmer and rectified by a rectification circuit, the active damper including a damper resistor and a damper switch connected to the damper resistor in parallel, the driving method comprising:
   charging a capacitor connected between a gate electrode and a source electrode of the damper switch during an initial period from a turn-on time of the dimmer;
   turning on the damper switch when a gate-source voltage of the damper switch reaches a threshold voltage by a voltage charged in the capacitor during the initial period; and
   after turning on the damper switch, turning off the damper switch based on a voltage that is developed and sensed across the damper resistor.

9. The driving method of claim 8, further comprising, during a normal period during which the damper switch is turned on, constantly maintaining a both-end voltage of the damper resistor with the threshold voltage.

10. The driving method of claim 9, further comprising;
    flowing the input current through the damper resistor during the initial period; and
    flowing the input current through the damper switch during a normal period.

11. The driving method of claim 8, further comprising;
    connecting a diode when a both-end voltage of the damper resistor becomes lower than the threshold voltage of the damper switch by a decrease of the input current; and
    discharging the voltage charged in the capacitor through the connected diode.

* * * * *